Figure 1:
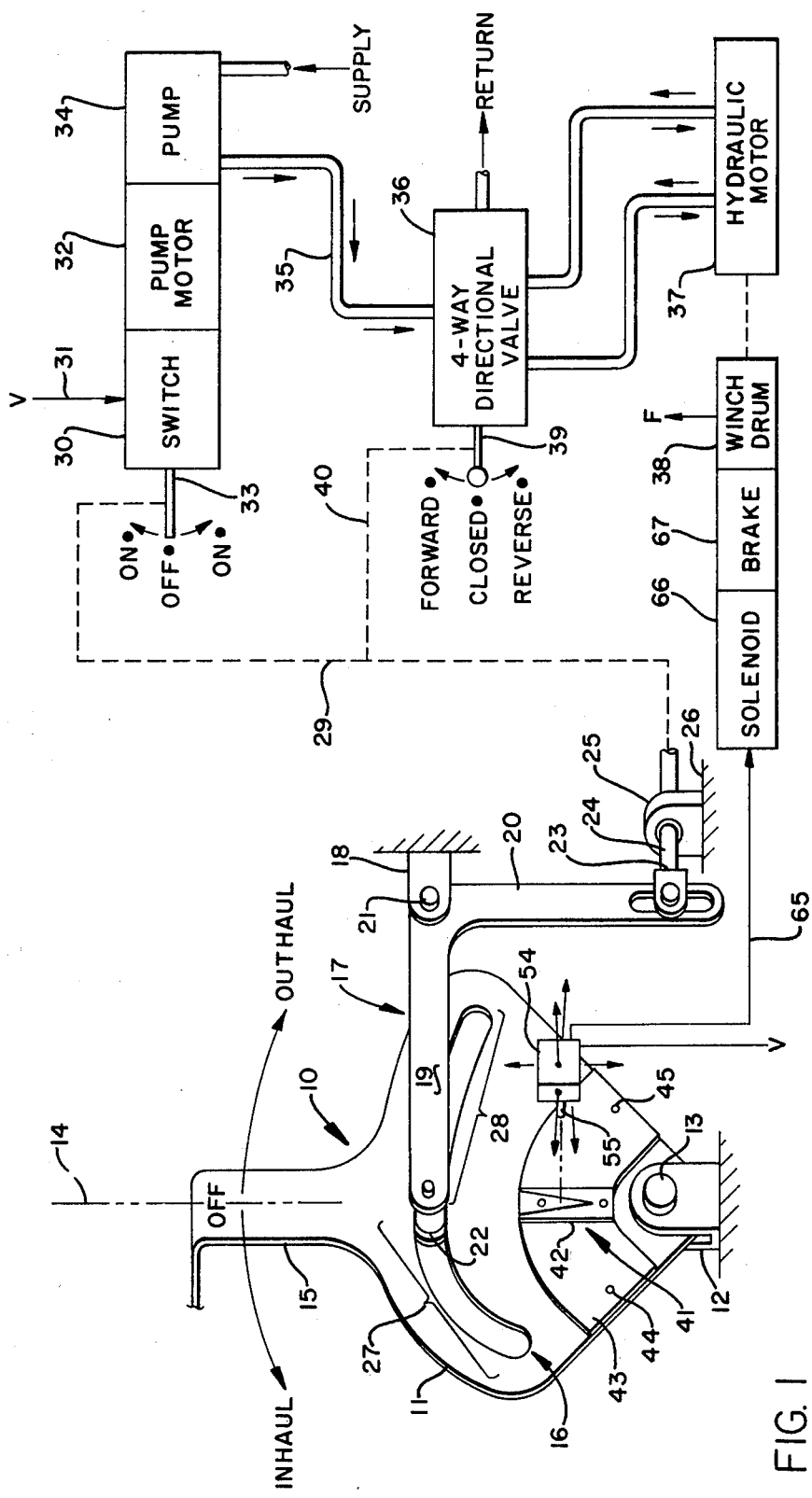

United States Patent [19]

Laky

[11] 4,095,424
[45] Jun. 20, 1978

[54] VARIABLE HYDRAULIC PUMP NONLINEAR CONTROL WITH CAM-ACTUATED, ADJUSTABLY-SEQUENCED SECONDARY CONTROL

[75] Inventor: Tibor Laky, Dallas, Tex.

[73] Assignee: Otis Engineering Corporation, Dallas, Tex.

[21] Appl. No.: 781,623

[22] Filed: Mar. 28, 1977

[51] Int. Cl.² ............................................. F15B 15/18
[52] U.S. Cl. ....................................... 60/436; 60/905; 74/471 R; 192/1
[58] Field of Search ................. 60/433, 434, 436, 443, 60/465, 905; 74/471 R, 480 R, 497, 567; 192/1, 3 R, 4 R; 417/315

[56] References Cited

U.S. PATENT DOCUMENTS

| 2,516,662 | 7/1950 | Vickers et al. | 60/905 X |
| 2,836,270 | 5/1958 | Leopold | 1,2/12 C |
| 2,872,827 | 2/1959 | Thoma | 192/4 R X |
| 3,107,490 | 10/1963 | Cooper et al. | 60/443 |

Primary Examiner—Edgar W. Geoghegan
Attorney, Agent, or Firm—Warren H. Kintzinger

[57] ABSTRACT

A nonlinear hydraulic pump control provides a primary control output as a mechanical actuator arm displacement either side of a neutral or "Off" position. A secondary control, also cam activated, operates in selectable offset sequence with the primary output, with the offset magnitude being selectively adjustable and effected either symmetrically about the primary control neutral position or differentially with respect thereto. The secondary control is useful in starting, stopping, or modulating accessory gear which cooperates with the pump operation, such as brake release control for a hydraulic winch to assure controlling hydraulic pressure buildup prior to brake release for both inhaul and outhaul operations where the winch cable is constantly subjected to tension loading.

10 Claims, 9 Drawing Figures

U.S. Patent  June 20, 1978  Sheet 3 of 3  4,095,424

VARIABLE HYDRAULIC PUMP NONLINEAR CONTROL WITH CAM-ACTUATED, ADJUSTABLY-SEQUENCED SECONDARY CONTROL

This invention relates in general to controls for hydraulically powered systems, and in particular to a pump control assembly useful in effecting a sequenced control of pump output pressure with operation of a secondary control means for the system.

The control means to be herein described is especially useful in controlling hydraulic pump pressure in a hydraulic winch system, with a selectively sequenced coordination between buildup of pump pressure and winch brake release for both inhaul and outhaul operational modes of a winch upon which is imposed a constant tension cable loading. Although the invention will be described in this environment, the inventive principle is equally useful in providing, in combination with a primary pump control for a hydraulic system, a sequentially offset secondary control function, or functions, for controlled operation of an accessory mechanism, or mechanisms, associated with a hydraulically controlled mechanism.

There exists a recognized need for a coordinated control of brake release and power application in a winch system where the cable carrying drum is constantly under load. For example, in a tethered balloon system, employing a hydraulically operated winch, the balloon exerts a pull on the winch cable. In the absence of a brake control for the winch drum, the tension loading of the cable may be sufficient to overcome hydraulic pressure in the drive system, causing the balloon to unwind cable from the winch. Brakes are therefore essential to maintain a desired balloon height. In this absence of coordination between brake release and hydraulic pump control, if the brake were released prior to sufficient hydraulic pressure buildup in the drum drive system, the balloon lift, in overpowering the system pressure, would cause the balloon to rise at its own rate. When the drive system catches up to this cable outhaul rate, a jerking motion transfer would be imparted to the balloon via the cable tether. The jerking motion might be sufficient to severely damage or sever the cable anchor. Balloon cable anchors are often in the form of "tire patches" affixed to the balloon skin. While these anchors may withstand considerable static loading, a dynamic loading, such as a jerking pull, may tear out the anchor.

Even more damaging is the resultant dynamic loading imparted when the balloon is to be lowered via driven inhaul on the tether cable. In this instance, a system employing brake release at the instant of primary pump control would permit the balloon to initially rise due to the imparted lift being in excess of winch drive hydraulic pressure. Here, upon subsequent pressure buildup sufficient to overpower the lift of the balloon, outhaul cable motion suddenly becomes inhaul cable motion. The dynamic outhaul motion coupled with winch powered inhaul loading could result in an extreme dynamic loading on the cable ends, sufficient to inflict damage upon, or failure of, the balloon tether.

A similar problem is encountered in hydraulically driven winches used in diving bell systems, where the bell exerts tension loading on the winch cable. Here brake release, prior to sufficient hydraulic pressure buildup to raise the bell, causes an initial sinking motion of the bell prior to raising. While the cable anchoring means employed in a diving bell system may be mechanically sufficient to preclude tether failure, the occupants of the bell may be subjected to motionimparted discomfort and/or loss of balance.

For the above reasons, a coordinated control between brake release and cable inhaul and outhaul power application has been recognized in the art. In general, means have been employed in hydraulic systems to delay brake release until primary pump control has permitted sufficient pressure buildup for proper operation of the winch. Known systems have, however, been relatively complex in nature, and designed for some fixed relationship between pressure buildup and brake release which is useful in effecting proper winch control for a particular application. For example, U.S. Pat. No. 2,836,270 to Alfred Leopold recognizes the aforedescribed problem and provides a sophisticated spring biased hydraulic piston arrangement in a hydraulically operated winch, useful in establishing a predetermined fixed sequence between drive clutch engagement and brake release.

Still other known expedients employ special combinations of lever arrangements to effect a particular sequence between imparted drive and brake release.

Known systems are accordingly specifically designed for, and dedicated for optimum usage with, a particular application, and there exists a need for a sequential primary pump control and secondary control (as for brakes) in a hydraulic winch system which permits an adjustable sequence between primary and secondary control, thus permitting system control optimization for a particular one of different applications.

Therefore, a principal object of this invention is to provide a selectively sequenced primary and secondary control system for a hydraulically operated winch system.

Another object is to provide a control system with relatively non-complex mechanical adjustment means to effect a predetermined primary and secondary control actuation sequence.

A further object for such a control system is the provision for mechanically adjustable symmetrically or differentially offset primary and secondary controls for bi-directional operation of a hydraulically operated winch system.

A still further object is the provision of a selective sequentially-sequenced primary and secondary control mechanism, plural ones of which may be operated in concert to control associated interacting controlled devices in a predetermined manner.

Features of this invention useful in accomplishing the above objectives include, in an adjustable-offset, sequential primary and secondary control system, first cam and cam follower means operable either side of a neutral position to provide a predetermined primary control, cam-follower-displacement-defined output as a predetermined function of a control handle position; and a second cam and cam follower means operated in concert with said first cam and cam follower means to provide a secondary cam-follower-displacement-defined output as a selectable function of a control handle position. The secondary cam surface and cam follower are relatively positionable with camming action therebetween determined by a particular cross-section defined profile of a cam surface which is selected to engage the secondary cam follower--the conformation being such as to impart a predetermined maximum rise to the follower throughout the longitudinal axis of the cam and over selected successively lesser increments of control handle displacement either side of neutral position. Provision is made for laterally offsetting a selected maximum displacement range of the secondary cam follower with respect to the control handle neutral position, thereby permitting the maximum rise of the secondary cam follower to be selectively, differentially effected with respect to the control handle neutral position, and permitting the maximum rise of the secondary cam follower to be selectively differentially effected with respect to the control handle neutral position. The maximum rise imparted to the secondary cam follower is adjustably maintained throughout a selected range of control handle displacement and this selected range may extend symmetrically about the control handle neutral position or be differentially offset with respect thereto.

Specific embodiments representing what are presently regarded as the best mode of carrying out the invention are illustrated in the accompanying drawing.

In the drawing

Figure 2:
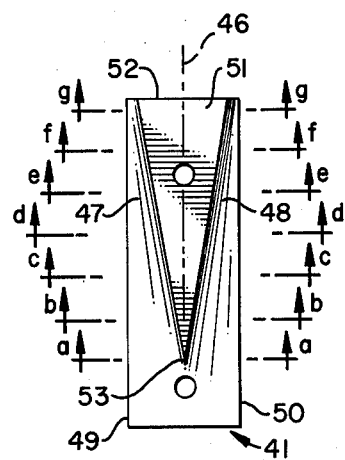
Figure 3:
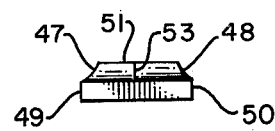
Figure 4:
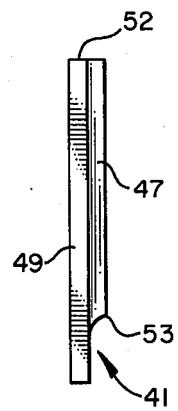
Figure 5:
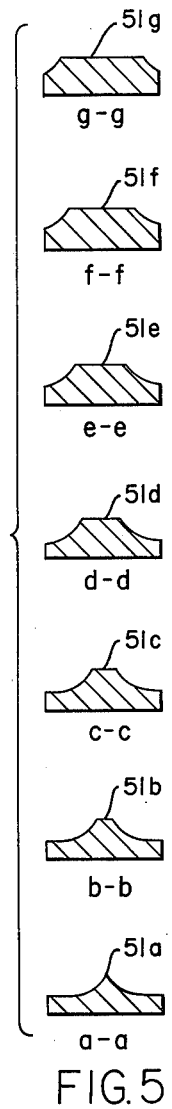
Figure 6:
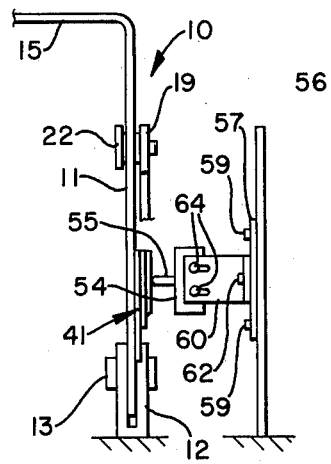
Figure 7:
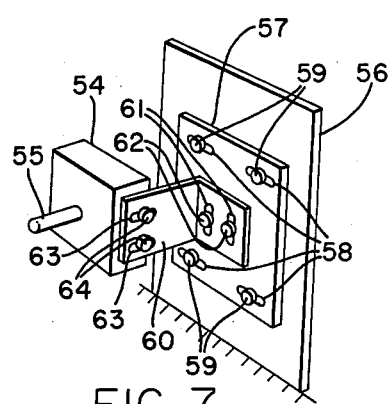
Figure 8:
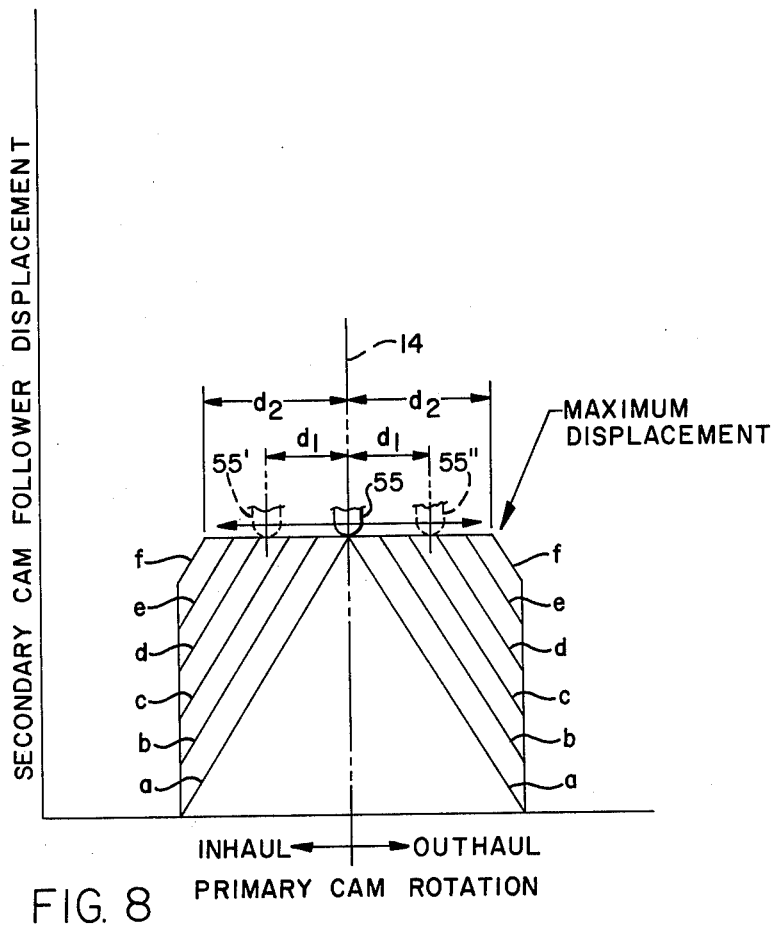
Figure 9:
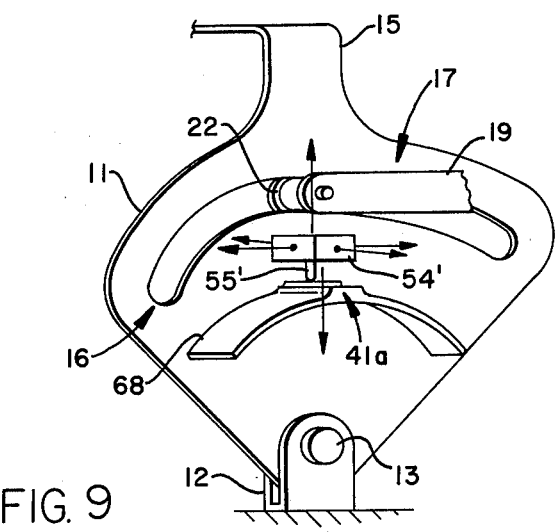

FIG. 1 represents a functional diagram of a dual-cam activated sequence-adjustable primary and secondary control mechanism in combination with a hydraulically operated winch;

FIG. 2, a top elevation view of a secondary cam useable in the mechanism of FIG. 1;

FIG. 3, an end view of the cam of FIG. 2;

FIG. 4, a side view of the cam of FIG. 3;

FIG. 5, longitudinally displaced cross-section views of the cam of FIG. 2;

FIG. 6, a functional mechanical representation of laterally and longitudinally adjustable mounting means for the secondary cam follower activated means of FIG. 1;

FIG. 7, a perspective view of the mounting means of FIG. 6;

FIG. 8, a graphical secondary cam displacement diagram depicting variable maximum rise profile width and differential offset thereof with respect to the primary cam neutral axis; and FIG. 9, an alternative embodiment of the secondary cam and cam follower of FIG. 1.

Referring to the drawing

FIG. 1 illustrates the control mechanism as utilized in providing sequential control for the pump of a hydraulic winch system and an associated winch drum brake. A control lever member 10 comprises a plate 11 which is pivotable with respect to a fixed base member 12 about an axis defined by pivot pin means 13. Plate 11 is pivotable about a neutral (off) axis 14 by means of an extending control handle member 15.

Control plate 11 is formed with a through-slot cam 16, the camming surface profiles of which are defined by preselected radii from pivot pin means 13. An L-shaped actuator arm 17 is pivotably mounted to a fixed base member 18 at the junction of extending legs 19 and 20 by means of a pivot pin means 21. The end of leg 19 carries a cam follower means comprising a screw member 22 affixed to leg 19 with the enlarged head portion thereof spaced to juxtapose plate 11 on the opposite side from leg 19, thereby maintaining follower 22 in captive sliding engagement with the edges of cam slot 16.

The other leg 20 of the L-shaped actuator arm 17 is pivotably connected via slotted pivot pin means 23 to one end of an actuator rod 24, with rod 24 being slideably received in a member 25 connected to fixed base member 26. By judicious choice of lengths of legs 19 and 20 of L-shaped actuator arm 17, pivot action imparted to arm 17 about pivot means 21, as cam plate 11 is pivoted about pin 13 via movement of control handle 15, is converted via the actuator arm 17 to axial translation of actuator rod 24, with any slight pivoting action imparted to rod 24 allowed via the slotted pivot means 23. As depicted in FIG. 1, the axial displacement of actuator rod 24 from a control handle 15 neutral axis defined position, is defined by the cam profile of the slot 16 in plate 11. Movement of control handle 15 in the depicted "outhaul" direction from neutral axis 14 position displaces actuator rod 24 via cam follower 22 engaging the outhaul portion 27 of cam slot 16. Movement of control handle 15 in the depicted "inhaul" direction from neutral axis 14 position displaces actuator rod 24 via cam follower 22 engaging the inhaul portion 28 of cam slot 16. The inhaul displacement of actuator rod 24, as defined by progressively greater cam slot radii, causes an upward motion of cam follower 22 to move actuator rod 24 to the left in FIG. 1; while outhaul displacement of actuator rod 24, as defined by progressively lesser cam slot radii causes a downward motion of cam follower 22 to move actuator rod 24 to the right in FIG. 1. The displacement of actuator rod 24 from neutral position in either direction is thus a function of the radii of cam slot 16 addressing cam follower 22 for any given angular pivot of cam plate 11 from the neutral axis position.

The axial displacement of actuator rod 24 may be utilized as primary control for a hydraulic winch, as depicted in FIG. 1. Rod 24, via mechanical interconnection 29, may control a switch 30 to apply a power source 31 to pump motor 32 when switch activator arm 33 is moved either side of an "off" center position corresponding to the neutral position of the control mechanism control lever 15. Hydraulic pump 34 is thus activated when control lever 15 is displaced either direction from neutral position. Pump 34 may supply fluid via line 35 through a 4-way directional valve 36 to hydraulic motor 37 which powers winch drum 38. Directional valve 36 may be controlled via actuator arm 39 to direct fluid in one direction or the other through motor 37 and may be positioned via a mechanical interconnection 40 with actuator rod 24 to define an "off" (central) position corresponding to the neutral position of control handle 15, and to respective "inhaul" and "outhaul" positions either side of center. Valve 36 may be appropriately ported to supply fluid to motor 37 at increasing greater rates with increasing off-center displacement of valve control arm 39. The speed of drive motor 37 may then be controlled as a function of the contour of the primary control cam slot 16.

In accordance with the present invention, the primary pump control mechanism is supplemented by a secondary cam defined control function which bears a selected, sequential operational relationship to the primary control actuator rod output displacement. As employed in controlling a hydraulic winch, the secondary control may be employed to operate the winch brake. With reference to FIG. 1, the plate member 11 carries a secondary cam member 41. Cam member 41 might be received in a slot 42 formed in a plate member 43 affixed to the surface of the primary control plate member 11 by threaded fasteners 44–45 passing through plate 11 and received in threaded blind holes in plate 43. Cam member 41 is affixed within slot 42 of plate 43 via fasteners extending through plate 43 into threaded blind holes in cam member 41.

As depicted in FIG. 1, and best shown in FIGS. 2 - 5, cam member 41 is three-dimensional, and provides a variable-width maximum displacement camming profile symmetrically either side of and along longitudinal axis 46. The profile is defined by inclined side surfaces 47 and 48 extending respectively between cam profile side extremes 49 and 50 and contiguous with a maximum rise defining surface 51. As shown in FIGS. 3 and 4, the cam profile, throughout the longitudinally extending profile range, defines a predetermined maximum rise which varies in width from a maximum width at upper end 52 down to a keen taper at end 53. FIG. 5 shows sections of the cam profile taken along corresponding lines in FIG. 2, showing the same maximum displacement throughout the longitudinal extent of the cam surface, with the maximum displacement imparting profile varying in width from a keen edge at $51a$ through progressively greater widths $51b - 51g$.

As seen in FIG. 1, cam member 41 is fixed with respect to primary control cam plate 11 such that the longitudinal axis 46 of cam member 41 is aligned with the neutral axis 14 of plate 11, i.e., the longitudinal axis of cam member 41 aligns with the neutral position of the primary control cam slot 16 in plate 11. Any point on cam member 41 pivots about the pivot pin 13 of plate 11 when control handle 15 is moved either side of the neutral axis 14.

Secondary control action in the system of FIG. 1 is effected by the motion of a secondary cam follower engaging a selected cross-section of cam member 41 as member 41 is moved transversely with respect to the primary control neutral axis 14. As shown functionally in FIG. 1, the secondary control may comprise a limit switch 54 having a switch actuator arm 55 positioned to be actively engageable with secondary control cam member 41. Switch member 54 is functionally depicted in FIG. 1 as being positionable both along the longitudinal axis of cam member 41 and transversely of the longitudinal axis of cam member 41. In addition, switch member 54 is functionally depicted as being positionable normal to cam member 41, the latter position being selectable to effect proper full design movement of the switch actuator arm (cam follower) as it engages cam member 41.

The three-axis positionability of switch member 54 may be realized by the mounting means shown in FIGS. 6 and 7. Switch member 54 may be mounted to a further fixed base member 56 in the form of a suitably rigid plate. A mounting plate 57 is formed with horizontally-extending through-slots 58, with screw members 59 having threaded shanks slideably received in slots 58 and in threaded engagement with fixed base member 56. Plate 57 may thus be adjustably positioned on base member 56 throughout a position range defined by the length of slots 58.

An L-shaped mounting bracket 60 has one arm adjustably affixed to horizontally adjustable plate 57 by means of vertically extending through-slots 61 formed in bracket 60, with shank portions of screws 62 slideably received in slots 61 and in threaded engagement with plate 57. Thus, the actuator arm 55 of switch member 54 may be positioned both vertically and horizontally with respect to base member 56, and thereby with respect to pin 13 on fixed base member 12 about which primary control cam plate 11 pivots. Switch 54 is positioned on the other arm of bracket 60 by means of horizontally extending through-slots 63 in bracket 60, with shank portions of screws 64 slideably received in slots 63 and in threaded engagement with bracket 60. This adjustment is provided for positioning the cam follower arm 55 normal to the profile of cam 41 to realize full control arm movement.

With the primary control cam in the afordefined neutral position, the secondary control switch member 54 may then be positioned for cooperative engagement of switch actuator arm 55 with a selected cross-section of cam 41. This position may be chosen to lie on the longitudinal axis 46 of cam 41 such that the camming displacement profile defined by the selected cross-section of cam 41 is symmetrical about the neutral axis position of the primary control arm, or, the position may be adjusted transversely to effect, within a predetermined range, a desired offset of the secondary cam displacement profile from neutral. The keen edge 53 of the secondary cam provides a precision reference for symmetrical positioning of the secondary control switch actuator arm, with the actuator arm first positioned vertically to align with the keen edge. Subsequent vertical positioning of the switch actuator arm then permits selection of successive symmetrical secondary control camming profiles having progressively wider maximum-displacement profile segments.

Now, with reference again to FIG. 1, the secondary control switch 54 may, when activated, apply an energizing voltage source, V, to secondary control line 65. In the hydraulic winch system of FIG. 1, line 65 might be connected to a solenoid 66 controlling a brake 67 for winch drum 38, with the above-described preselection of a particular secondary cam displacement profile, either symmetrically about, or offset with respect to, the neutral (off) position of the primary control cam, establishing a winch brake release point offset as desired from inhaul and outhaul hydraulic pump primary control activation to optimize winch operation for a particular winch cable load, F. The secondary (brake) control may be precision-adjusted for symmetrical offset (same offset magnitude for inhaul and outhaul) and the offset magnitude may be selected within the range defined by secondary control cam 41. Asymmetrical offsets of secondary control may be precisely set in a differential manner for any selected secondary camming profile, since cam 41, for all selected displacement profiles as concerns the secondary cam follower, imparts the same maximum cam follower displacement. With switch 54 being closed upon maximum displacement being imparted to switch actuator arm 55, brake release and brake application may be optimized as concerns both inhaul and outhaul primary control operations.

FIG. 8 diagrammatically represents selected secondary cam profiles and secondary cam follower offsets. Secondary control cam follower (switch actuator arm 55) may be positioned to address selected secondary cam profiles $a—a$ through $f—f$. Maximum secondary control cam displacement is the same for any selected profile. For any selected profile, actuator arm 55 may be offset from the primary control neutral-axis-defined position, as depicted by positions 55' and 55'', to thereby effect differential offsets as concerns inhaul and outhaul primary control. The center position of actuator arm 55 effects symmetrical inhaul and outhaul offsets of varying magnitude depending on the selected profile; for example, offsets $d_1$ by selection of profile $d—d$, or offsets $d_2$ by selection of profile $f—f$.

The above-described secondary cam profile offset with respect to the primary control neutral axis has been described with respect to an embodiment having secondary cam 41 fixed symmetrically with respect to the primary control neutral axis, with secondary cam profile selection and offset effected by positioning of the secondary cam follower along and/or to either side of the primary control neutral axis. FIG. 9 depicts functionally an alternative arrangement, with secondary cam 41a being oriented with longitudinal axis extending normally from the primary control cam plate 11, by being carried on an arcuate member 68 affixed to and extending from primary cam plate 11. Secondary control switch 54' is functionally depicted as being adjustable both along, and to either side of, the longitudinal axis of cam 41a. Appropriate mounting means for switch 54' might comprise essentially the multiple bracket and plate structure of FIGS. 6 and 7, rotated by 90°.

In either of the embodiments of FIGS. 1 and 9, offset secondary control cam action is effected by positioning of the secondary control cam follower. For purposes of the present invention, the desired secondary cam displacement action with respect to primary control actuation may obviously be realized by employing a fixed-position secondary cam follower in conjunction with a positionadjustable secondary cam of the type described.

It is further contemplated that the secondary control herein described may be useful for other than the described hydraulic winch brake control. Secondary control might comprise one or more different cams starting, stopping, or modulating other gear cooperating with the hydraulic pump operation. Secondary control described herein has been exampled by operation of a limit switch; however, the secondary control might be effected by alternative means, such as, for example, a cam follower activated four-way hydraulic valve to operate a hydraulic brake in the winch system. It is only necessary that the exampled limit switch or four-way valve be located in relation to the cam follower that full contact arm or valve spool movement is possible.

Thus, whereas this invention is herein illustrated and described with respect to particular embodiments thereof, it should be realized that various changes may be made without departing from essential contributions to the art made by the teachings hereof as set forth in the following claims.

I claim:

1. A control system comprising means for generating a primarly control output defined by first and second primary control functions each contiguous with a primary control neutral position; means for generating a secondary control output bearing a selectable, sequential relationship with said primary control output, said secondary control output defining first and second operational-definitive outputs; means for selectively, differentially adjusting said secondary control first and second operational and definitive outputs over the range of said primary control outputs; and means for selectively, asymmetrically offsetting one of said secondary control outputs with respect to said primary control neutral position.

2. The control system of claim 1, with said secondary control generating means comprising a longitudinally extending secondary cam means having successive symmetrical rise defining profiles over the longitudinal extension thereof, with progressively greater profile segments thereof in excess of a predetermined rise; a secondary cam control cam follower means; means for positioning one of said secondary cam and cam follower means symmetrically with respect to said primary control neutral position; means for selectively positioning said secondary cam and cam follower relatively, one to the other; with said secondary control first and second operational-definitive outputs defined respectively by said secondary cam follower engaging secondary cam follower profile segments having rises respectively in excess of, and less than, said predetermined rise.

3. The control system of claim 2, with said means for generating said primary control output comprising a plate member pivotably mounted with respect to a pivot axis and to either side of a defined neutral position axis, a primary control cam surface means carried by said plate member and having a predefined surface displacement radii function with respect to said pivot axis and extending either side of a neutral position radii; and a primary control cam follower means mounted in driven displacement communication with said cam surface means with the displacement of said primary control cam follower means by said cam surface means radii on respective sides of said neutral position radii respectively comprising said first and second primary control functions.

4. The control system of claim 3, with said primary control cam surface means comprising a slot formed in said plate member, and said primary control cam follower comprising a member mounted in sliding engagement with said slot and constrained to displacement radially of said pivot axis.

5. The control system of claim 4, with one of said secondary control means cam means and cam follower means being affixed to said primary control plate member at a position radially disposed from said plate means pivot axis and symmetrically with respect to said plate member neutral position axis, and means for mounting the other of said secondary control cam follower means and secondary control cam means in a selected fixed position along and/or to either side of the neutral axis of said plate member with said plate member in the neutral position thereof.

6. The control system of claim 5, with further means for selectively positioning said other one of said secondary control cam follower means and secondary control cam means normally of said primary control plate member.

7. The control system of claim 6, with said secondary control cam means being affixed to said primary control plate member symmetrically about said neutral axis and extending longitudinally radially outward from said pivot axis, with rise-imparting profiles thereof being normal to the surface of said plate member.

8. The control system of claim 7, with successive cross sections of said secondary control cam means exhibiting predetermined maximum rise imparting profile segments the successive widths of which vary in proportion to radial displacement thereof from said pivot axis, including a minimum, keen-edge-like width.

9. The control system of claim 1, in combination with a hydraulically-driven winch including a hydraulic pump, a hydraulic winch drive motor, a four-way reversing valve for reversing fluid flow from said pump through said motor, and winch drum brake means; means connecting said primary control output to said pump and reversing valve for selectively driving said motor, and means for connecting said secondary control output to said winch drum brake means to effect a selected offset between brake application and release functions and pump activation and deactivation functions.

10. The control system of claim 8, in combination with a hydraulically-driven winch including a hydraulic pump, a hydraulic winch drive motor, a four-way reversing valve for reversing fluid flow from said pump through said motor, and winch drum brake means; means connecting said primary control output to said pump and reversing valve for selectively driving said motor, and means for connecting said secondary control output to said winch drum brake means to effect a selected offset between brake application and release functions and pump activation and deactivation functions.

* * * * *